Nov. 6, 1962     W. FRANZEN ET AL     3,063,005
TRANSFORMER APPARATUS
Filed Nov. 10, 1959
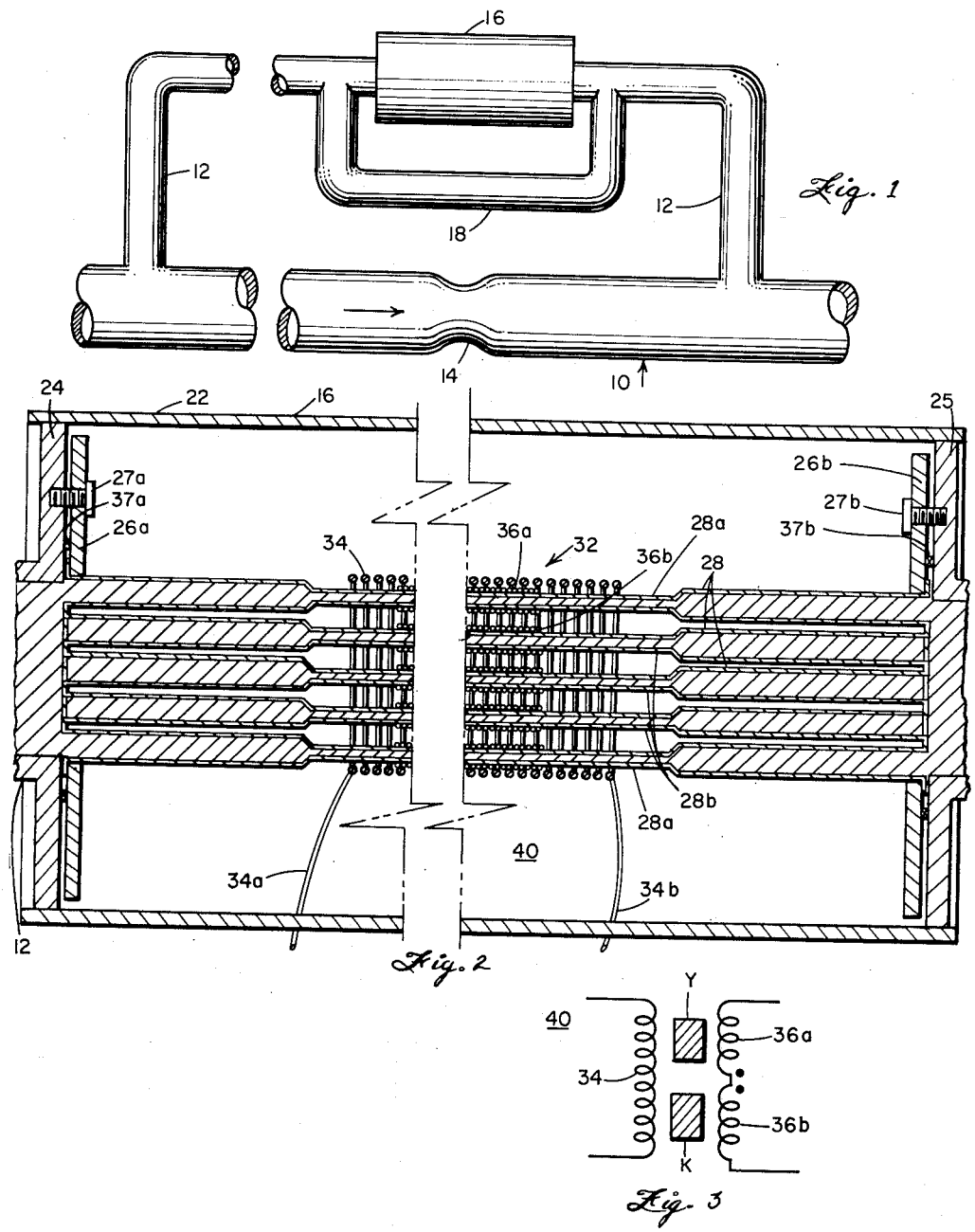
INVENTORS
JAMES NICOL
WOLFGANG FRANZEN

United States Patent Office 3,063,005
Patented Nov. 6, 1962

3,063,005
TRANSFORMER APPARATUS
Wolfgang Franzen, Westford, and James Nicol, Wayland, Mass., assignors to the United States of America as represented by the United States Atomic Energy Commission
Filed Nov. 10, 1959, Ser. No. 852,157
3 Claims. (Cl. 324—34)

The present invention relates to apparatus for detecting changes in para-magnetic susceptibility, and more particularly to transformer apparatus in which a mutual inductance bridge is established to detect changes in the para-magnetic susceptibility of a flowing solution.

For the determination of the amount of a para-magnetic substance dissolved or suspended in a diamagnetic substance as, for example, a solution of small amounts of uranium in liquid bismuth, several techniques have been suggested, included among which is the detection of the uranium by means of the measurement of the magnetic susceptibility of the liquid metal stream. This is based on the principle that uranium is a para-magnetic substance and its paramagnetic susceptibility is largely independent of the physical environment of the uranium atoms. On the other hand, bismuth is diamagnetic and its susceptibility is temperature-independent above its melting point. Moreover, bismuth is almost a semi-conductor and thus has a larger electrical resistivity than any other metal. As a result, the skin depth which characterizes the penetration of an A.-C. magnetic field into the metal is very large, and the use of a low-frequency A.-C. bridge method as a means of measuring the susceptibility of the liquid metal stream is feasible. Apparatus developed for the detection of a paramagnetic material suspended or dissolved in a diamagnetic substance is described in U.S. patent application Serial No. 718,582, filed on March 3, 1958, in the name of James Nicol, and now Patent No. 3,029,385. The apparatus therein described is by the instant invention made useful to measure the amount of uranium present in a flowing liquid bismuth as found in a liquid metal fuel reactor such as the one disclosed in application Serial No. 767,245, filed October 14, 1958, in the names of Happell et al. and now abandoned. In this reactor, the liquid metal bismuth under high temperature circulates through the reactor wherein the concentration of the uranium reaches a critical value thereby raising, among other effects produced, the temperature of the bismuth which is then transported into an area for heat exchange and ultimate use in the generation of steam for power or other purposes. It is necessary, of course, to monitor the amount of uranium in solution so as to detect any changing conditions requiring correction to maintain continuous ad efficient operation of the reactor. One way of utilizing the aforementioned Nicol apparatus to detect and measure the uranium content of the bismuth would be to remove samples of the bismuth-uranium solution at regular intervals to make the analysis for the amount of uranium present, and then, of course, return the sample to the stream. The disadvantage of this arrangement is that it does not provide a continuous form of measurement, and involves handling, to an extent which would be desirable to avoid, the radioactive solution of the uranium and bismuth. In addition, due to the time which must necessarily be consumed in opening up the bismuth-uranium solution, removing the sample, having the sample analyzed, and returning the sample to the loop, it would require very elaborate apparatus to take and analyze frequent enough samples to obtain results which could be integrated for obtaining accurate values for the total amounts of uranium flowing.

The invention herein described has to do with apparatus for utilizing the aforementioned Nicol apparatus or similar arrangements with a continuously flowing solution so as not to interfere with the operation or flow. In the instant invention this is accomplished by providing a main by-pass for a portion of the flowing stream and a specially designed manifold in the main by-pass for supporting the primary and secondary electrical coils forming part of the inductive bridge, and a secondary by-pass for the manifold in order to insure that the proper pressure drop across the manifold will occur. The manifold itself is designed as a hermetically sealed unit to meet the requirements of the electronic circuits employed with regard to sensitivity and response time, to obtain the proper inductive relationship between the solution undergoing measurement with that of the control or standard fluid, to obtain a condition of thermal equilibrium in the entire system so as to avoid any distortion in the output resulting therefrom, and to obtain the cancellation of miscellaneous eddy current signals in the bismuth and other materials utilized in the manifold so as to produce signals which are dependent purely on the effect of the uranium present in the liquid bismuth.

It is thus a first object of this invention to provide apparatus for sampling a solution such as uranium-bismuth for obtaining measurements of paramagnetic susceptibility of the paramagnetic material therein.

It is a further object of this invention to provide transformer apparatus for obtaining adjustable magnetic coupling between primary and secondary coils.

It is another object of this invention to provide an inductive coupling between a single primary coil and a plurality of secondary coils in which cores of pure diamagnetic material are compared iwth cores containing a solution of paramagnetic substance in a diamagnetic substance for measuring the amount of the paramagnetic sustance in solution.

It is still another object to provide transformer apparatus for obtaining variable and reference couplings between primary and secondary coils.

Other objects and advantages of this invention will hereinafter become more evident in view of the following discussion and description with reference to the attached drawing in which:

FIGURE 1 is a view of an arrangement for by-passing some of the solution for measurement thereof in accordance with this invention;

FIGURE 1 is a detailed view in section of the inventive apparatus; and,

FIGURE 3 is an electrical schematic embodying the arrangement shown in the previous figures.

Referring to FIGURE 1, for application of the invention to the uranium-bismuth solution or suspension of a liquid metal fuel reactor, there is shown a conduit 10 in which the main bismuth stream with uranium in solution or suspension flows and a by-pass arrangement consisting of a main by-pass line 12 across an orifice or flow obstruction 14 in conduit 10 to increase pressure drop in main by-pass line 12. In by-pass 12 there is provided a housing 16 containing the manifold arrangement, to be later more particularly described, and a secondary by-pass 18 for minimizing the pressure drop across housing 16. As more particularly illustrated in FIGURE 2, housing 16 consists of a cylindrical casing 22 typically of steel construction supported at the ends thereof by flange members 24 and 25 which are supported on main by-pass line 12. Within housing 16, a pair of suitable annular flanges 26a and 26b supported by bolts 27a and 27b, respectively, support a plurality of tubular members 28 which are spaced and arranged to obtain in any suitable manner, the results hereinafter described. Tubes 28 are divided into tubes 28a and 28b which are open and closed respectively to the stream in pipe 12. Wrapped around tubes 28 in area 32 is a primary electrical coil 34 having lead lines 34a and 34b extending through appropriate openings in container 22. Around each one of tubes 28a and 28b secondary coils 36a and 36b are provided, respectively, each of which has its own lead lines (not illustrated) which extend out through housing 22. Tubes 28 are narrowed down in area 32 to leave room for coils 34 and 36. Tubes 28b are blocked off at their ends and contain therein bismuth without any uranium in solution, but are identical otherwise to the bismuth flowing in main flow line 10. The bismuth in tubes 28b acts as the control or reference element. Tubes 28a are open at their ends to permit the flow of uranium-bismuth solution therethrough. The number of tubes 28a and 28b is determined by the concentration of the uranium in the bismuth and the sensitivity of measuring apparatus. Tubes 28a and 28b are arranged so that the average magnetic field (generated by primary 34) through tubes 28a will be the same as through tubes 28b.

Tubes 28a and 28b are welded to flanges 26a and 26b which are sealed to flanges 24 and 25 by means of metal gaskets 37a and 37b. Except for outside tube 22 and flanges 24 and 25, all of the interior metal forming tubes 28 and flanges 26a and 26b are tantalum for a reason to be later described. The space between the tubes 28 and container 22 is filled with dry argon under pressure to avoid the oxidation of the tantalum which occurs at high temperatures in air. This construction results in a hermetic seal of the tantalum tube system. If a failure of the metal gaskets 37a and 37b should occur, the space ordinarily filled with dry argon will fill up with liquid bismuth. This would, of course, make the monitoring device inoperative, but it would not interfere with the flow of the bismuth-uranium in pipe 10. Suitable insulation of the various leads to the coils and the coils themselves is provided; and the use of anodized aluminum wire is suitable for this purpose. It is also possible to anodize the tantalum by well known techniques producing an insulating film of $Ta_2O_5$ on the surface of each tube 28.

All of the secondary coils 36a surrounding the solution tubes 28a are connected in series and in adding relationship, thereby constituting effectively a single coil, and all of the coils 36b surrounding the sealed tubes 28b containing pure bismuth metal are likewise connected to form a single secondary coil of the transformer thereby formed within housing 16. In this manner, as illustrated in FIGURE 3, there is formed a transformer designated 40 having a primary 34 with secondaries 36a and 36b having cores Y and K respectively representing the uranium-bismuth solution or suspension and the pure bismuth, for use in comparing the signals produced on secondaries 36a and 36b. Coils 36a and 36b are connected in opposing manner as indicated by the black dots.

The operation of the apparatus of FIGURES 1–3 is as follows:

Primary coil 34 produces a low-frequency alternating magnetic field in the region of the space traversed by tubes 28a carrying the flowing bismuth stream and closed tubes 28b containing the bismuth without uranium. Tubes 28a and 28b themselves are surrounded by the secondary coils 36a and 36b respectively as illustrated. The A.-C. signal picked up in the secondary coils, 36a and 36b, is a function of the magnetic permeability of the material in tubes 28. The signal is also affected by the permeability of the tubes themselves and by the eddy currents produced both in the liquid metal stream and in the tubes. Tubes 28 are constructed of suitable material such as tantalum as previously mentioned, and the signals from all the open tubes are placed in opposition to the signals from the closed ones in such a way (shown in FIGURE 3) that the net signal is zero when the open tubes 28a are also filled with pure bismuth. In the arrangement illustrated, all the tantalum tubes 28a and 28b have identical dimensions, and under a condition of thermal equilibrium in the entire system, the paramagnetic signal from the tantalum as well as the diamagnetic signals from the eddy currents in the tantalum and from the diamagnetism of the bismuth will tend to cancel. The diamagnetic signals from the eddy currents in the bismuth cancel only to the extent that the electrical conductivities of the pure and "contaminated" bismuth are the same. It should be noted that this arrangement is flexible as far as the design of the secondary coils and of the primary coils and currents are concerned. For example, by increasing the current in the primary or by increasing the number of turns in the secondary coils, it is possible to obtain a larger signal if needed. The arrangement illustrated is designed so that it will fit into a compact unit and a typical assembly unit would be only about 24 inches long.

By the arrangement hereinbefore described, it is possible to utilize continuous measurements of paramagnetic susceptibility in a practical fashion to obtain the continuous determination of the uranium in bismuth solution or suspension flowing in a liquid metal fuel reactor. Without interfering excessively with the flow of the uranium-bismuth solution in conduit 10, it has been made possible by the use of a modest flow obstruction 14 in main conduit 10 to obtain an affective utilization of the Nicol apparatus. The pressure drop across obstruction 14 is distributed by the use of the secondary by-pass 18 to achieve a very quick transport of liquid bismuth solution stream to the manifold entrance, and the pressure drop across housing 16 is then only a small fraction of the pressure drop across, for example, the 10 foot distance in the main tube which may be spanned by the main by-pass 12.

By the arrangement illustrated and described, there is obtained an A.-C. signal which is proportional to the uranium concentration in the bismuth. It has been found that the amplitude of the signal is such that a concentration of 1200 p.p.m. of the uranium in liquid bismuth should be measurable to an accuracy of + or —1% of the concentration. The response time of a typical circuit for use with this arrangement is approximately 4 seconds. The flow time of the bismuth stream in the tantalum tubing in a typical arrangement is also about 4 seconds, provided the flow obstruction 14 is chosen so that the pressure drop from the inlet to the outlet of the by-pass line is at some satisfactory level such as at least 6 lbs. per square inch. To this extent the system herein described meets the requirements that have been specified for the uranium monitor.

Thus this arrangement permits the effective utilization of a paramagnetic susceptibility measuring arrangement to function continuously and without the necessity to take samples at periodic intervals. It is also apparent that there has also been provided a unique transformer apparatus in which by the proper selection of the stationary and flowing fluids its magnetic characteristics may be adjusted as a time function.

As many changes could be made in the above construction without departing from the scope of this invention, it is intended that all matter contained in the above description or shown in the accompanying drawing shall be interpreted as illustrative and not in a limiting sense.

We claim:

1. Apparatus for measuring the amount of a paramagnetic material distributed in a diamagnetic fluid flowing in a pipe, an obstruction formed in said pipe to cause a significant pressure drop, a main bypass for a portion of said fluid around said obstruction, transformer means in said main bypass for receiving and discharging said bypassed fluid, and further means for reducing the pressure drop across said transformer means, said transformer means comprising, in combination, a plurality of parallel, hollow tubes mounted in a closely spaced relationship, several of which said tubes are sealed at the opposite ends thereof and contain trapped therein a portion of said diamagnetic fluid containing none of said paramagnetic material and the remaining of which said tubes are open to flow therethrough of said flowing containing said paramagnetic material, a primary inductive coil surrounding all of said tubes, a first group of secondary coils connected in series and adding relationship, each coil surrounding a sealed tube, a second group of secondary coils connected in series and adding relationship, each coil surrounding an open tube, and means connecting said two groups of secondary coils in series and in opposite polarity capable of producing when said primary coil is energized a net secondary signal dependent upon the relative magnetic properties of said trapped and flowing fluids indicative of the amount of said paramagnetic material distributed in said flowing fluid.

2. The apparatus of claim 1 in which said open and closed tubes are arranged so that the average magnetic field generated by said primary coil will be the same through said closed and open tubes.

3. The apparatus of claim 2 in which said fluid is liquid metal bismuth and said paramagnetic material is uranium.

References Cited in the file of this patent

UNITED STATES PATENTS

| | | |
|---|---|---|
| 1,952,185 | Smith | Mar. 27, 1934 |
| 2,405,137 | Gale et al. | Aug. 6, 1946 |
| 2,607,223 | Fleming | Aug. 19, 1952 |
| 2,929,985 | Havelka | Mar. 2, 1960 |